(12) United States Patent
Smith et al.

(10) Patent No.: US 10,400,644 B2
(45) Date of Patent: Sep. 3, 2019

(54) METHOD AND SYSTEM FOR ADJUSTING REDUCTANT DELIVERY INTO A SELECTIVE CATALYTIC REDUCTION WITH A FILTER (SCRF) DEVICE

(71) Applicant: GM GLOBAL TECHNOLOGY OPERATIONS LLC, Detroit, MI (US)

(72) Inventors: Michael A. Smith, Clarkston, MI (US); Luca Lauritano, Turin (IT); Luis Daniel Guerrero Cruz, Turin (IT); Claudio Ciaravino, Turin (IT); Gongshin Qi, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 84 days.

(21) Appl. No.: 15/655,398

(22) Filed: Jul. 20, 2017

(65) Prior Publication Data

US 2019/0024554 A1    Jan. 24, 2019

(51) Int. Cl.
| | |
|---|---|
| *F01N 3/08* | (2006.01) |
| *C01B 39/02* | (2006.01) |
| *F01N 3/029* | (2006.01) |
| *F02D 41/02* | (2006.01) |

(52) U.S. Cl.
CPC ......... *F01N 3/0814* (2013.01); *F01N 3/0293* (2013.01); *F02D 41/0235* (2013.01); *C01B 39/02* (2013.01)

(58) Field of Classification Search
USPC ......... 60/274, 276, 277, 286, 295, 297, 301, 60/303
See application file for complete search history.

(56) References Cited

U.S. PATENT DOCUMENTS

| | | | | |
|---|---|---|---|---|
| 7,937,935 | B2* | 5/2011 | Williams | ................ F01N 3/023 60/295 |
| 8,332,124 | B2* | 12/2012 | George | ................... F01N 3/021 701/102 |
| 9,133,752 | B2* | 9/2015 | Jun | ........................... F01N 9/00 |
| 10,077,700 | B2* | 9/2018 | Nagel | ..................... F01N 3/208 |
| 2015/0047328 | A1* | 2/2015 | Larose, Jr. | .............. F01N 3/035 60/297 |
| 2016/0258331 | A1* | 9/2016 | Ricci | ....................... F01N 3/208 |

* cited by examiner

*Primary Examiner* — Binh Q Tran
(74) *Attorney, Agent, or Firm* — Cantor Colburn LLP

(57) ABSTRACT

A method of adjusting reductant injection for a selective catalyst reduction device with a soot filter (SCRF) includes calculating, through a processor, an amount of soot in the SCRF, determining, through the processor, a shrinking core model of the SCRF based on the amount of soot, calculating, with the processor using the shrinking core model, an amount of reductant to inject into the SCRF, and injecting the amount of reductant into the SCRF.

15 Claims, 3 Drawing Sheets

METHOD AND SYSTEM FOR ADJUSTING REDUCTANT DELIVERY INTO A SELECTIVE CATALYTIC REDUCTION WITH A FILTER (SCRF) DEVICE

INTRODUCTION

The subject disclosure relates to the art of motor vehicles and, more particularly, to a system for predicting soot impact on a selective catalytic reduction with a filter (SCRF) device performance.

A selective catalytic reduction with filter (SCRF) device relies on a catalyst having a washcoat and a gaseous reductant to convert nitrogen oxides (NOx) into nitrogen and water. The SCRF device also includes a soot filter which traps soot that may be entrained in exhaust gases. Over time, the catalyst may degrade, causing a reduction in conversion efficacy. Specifically, degradation of the washcoat may lead to a reduction in chemical performance of the SCRF.

Maintaining NOx conversion performance of the SCRF is desirable. In addition to reducing chemical performance, factors may also impact physical or flow performance of an SCRF. During operation, a reductant, such as ammonia or urea is injected into the SCRF in an amount so as to promote a chemical reaction that maintains desirable performance characteristics. The amount of reductant injected may vary based on washcoat degradation levels. Maintaining desirable reductant injection ensures that emissions exiting a tail pipe stay within selected ranges. Accordingly, it is desirable to provide a system and method to model soot impact on flow performance of an SCRF in order to maintain desirable reductant injection levels and thus selected emissions abatement performance levels.

SUMMARY

In accordance with an aspect of an exemplary embodiment, a method of adjusting reductant injection for a selective catalyst reduction device with a soot filter (SCRF) includes calculating, through a processor, an amount of soot in the SCRF, determining, through the processor, a shrinking core model of the SCRF based on the amount of soot, calculating, with the processor using the shrinking core model, an amount of reductant to inject into the SCRF, and injecting the amount of reductant into the SCRF.

In addition to one or more of the features described above or below, or as an alternative, further embodiments could include wherein calculating the amount of soot includes determining a pressure change across the SCRF.

In addition to one or more of the features described above or below, or as an alternative, further embodiments could include wherein determining the shrinking core model includes modeling an artificial flow rate of exhaust gases flowing through the SCRF.

In addition to one or more of the features described above or below, or as an alternative, further embodiments could include wherein determining the shrinking core model includes determining a desorption amount of ammonia in the SCRF, and applying a shrinking core adjustment factor to the desorption amount.

In addition to one or more of the features described above or below, or as an alternative, further embodiments could include wherein calculating the amount of reductant to inject includes calculating a reductant adjustment using the shrinking core model.

In accordance with another aspect of an exemplary embodiment, a reductant injection control module includes a control module including a processor and a non-volatile memory including a set of instructions which, when executed, causes the processor to: calculate an amount of soot in the SCRF, determine a shrinking core model of the SCRF based on the amount of soot, calculate using the shrinking core model, an amount of reductant to inject into the SCRF, and control injection of the amount of reductant into the SCRF.

In addition to one or more of the features described above or below, or as an alternative, further embodiments could include wherein the set of instructions, when executed, cause the processor to determine a pressure change across the SCRF to calculate the amount of soot.

In addition to one or more of the features described above or below, or as an alternative, further embodiments could include wherein the set of instructions, when executed, cause the processor to model an artificial flow rate of exhaust gases flowing through the SCRF to determine the shrinking core model.

In addition to one or more of the features described above or below, or as an alternative, further embodiments could include wherein the set of instructions, when executed, cause the processor to determine a desorption amount of ammonia in the SCRF, and apply a shrinking core adjustment factor to the desorption amount to determine the shrinking core model.

In addition to one or more of the features described above or below, or as an alternative, further embodiments could include wherein the set of instructions, when executed, cause the processor to calculate a reductant adjustment using the shrinking core model to calculate the amount of reductant to inject.

In accordance with yet another exemplary aspect of an exemplary embodiment, a vehicle includes an internal combustion engine, an exhaust system including a selective catalyst reduction device with a soot filter (SCRF) fluidically connected to the internal combustion engine, and a reductant injection control module including a control module including a processor and a non-volatile memory including a set of instructions which, when executed, causes the processor to: calculate an amount of soot in the SCRF, determine a shrinking core model of the SCRF based on the amount of soot, calculate using the shrinking core model, an amount of reductant to inject into the SCRF, and control injection of the amount of reductant into the SCRF.

In addition to one or more of the features described above or below, or as an alternative, further embodiments could include wherein the set of instructions, when executed, cause the processor to determine a pressure change across the SCRF to calculate the amount of soot.

In addition to one or more of the features described above or below, or as an alternative, further embodiments could include wherein the set of instructions, when executed, causes the processor to model an artificial flow rate of exhaust gases flowing through the SCRF to determine the shrinking core model.

In addition to one or more of the features described above or below, or as an alternative, further embodiments could include wherein the set of instructions, when executed, cause the processor to determine a desorption amount of ammonia in the SCRF, and apply a shrinking core adjustment factor to the desorption amount to determine the shrinking core model.

In addition to one or more of the features described above or below, or as an alternative, further embodiments could include wherein the set of instructions, when executed, cause the processor to calculate a reductant adjustment using the shrinking core model to calculate the amount of reductant to inject.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
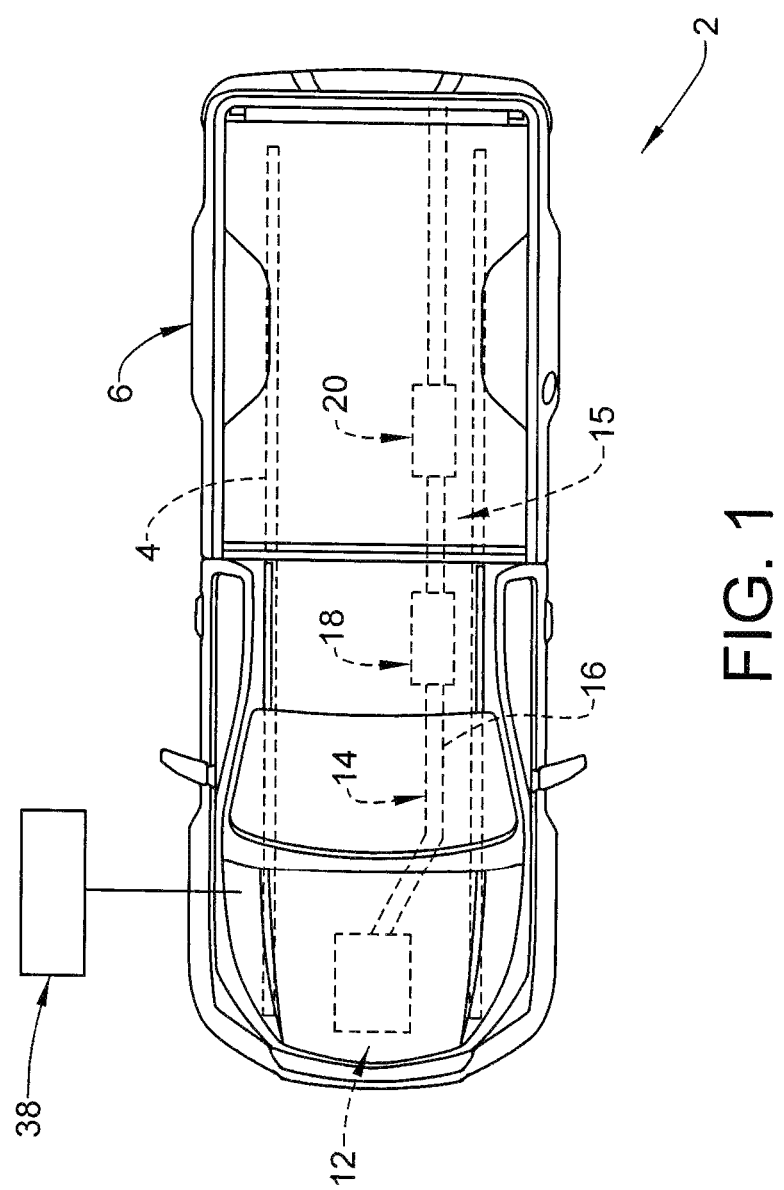
FIG. 1 depicts a vehicle including a system for adjusting reductant delivery into a selective catalyst reduction device having a filter (SCRF), in accordance with an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with an exemplary embodiment, is illustrated generally at 2 in FIG. 1. Vehicle 2 is shown in the form of a pick-up truck. It should be understood, that vehicle 2 may take on a variety of forms. Vehicle 2 includes a frame 4 that supports a body 6 and an internal combustion engine 12. Internal combustion engine 12 includes an exhaust system 14 and an exhaust gas treatment system 15, for the reduction of regulated exhaust gas constituents of an internal combustion (IC) engine 12. Exhaust gas treatment system 15 described herein can be implemented in various engine systems. Such engine systems may include, for example, but are not limited to diesel engine systems, gasoline engine systems, and homogeneous charge compression ignition engine systems.

Figure 2:
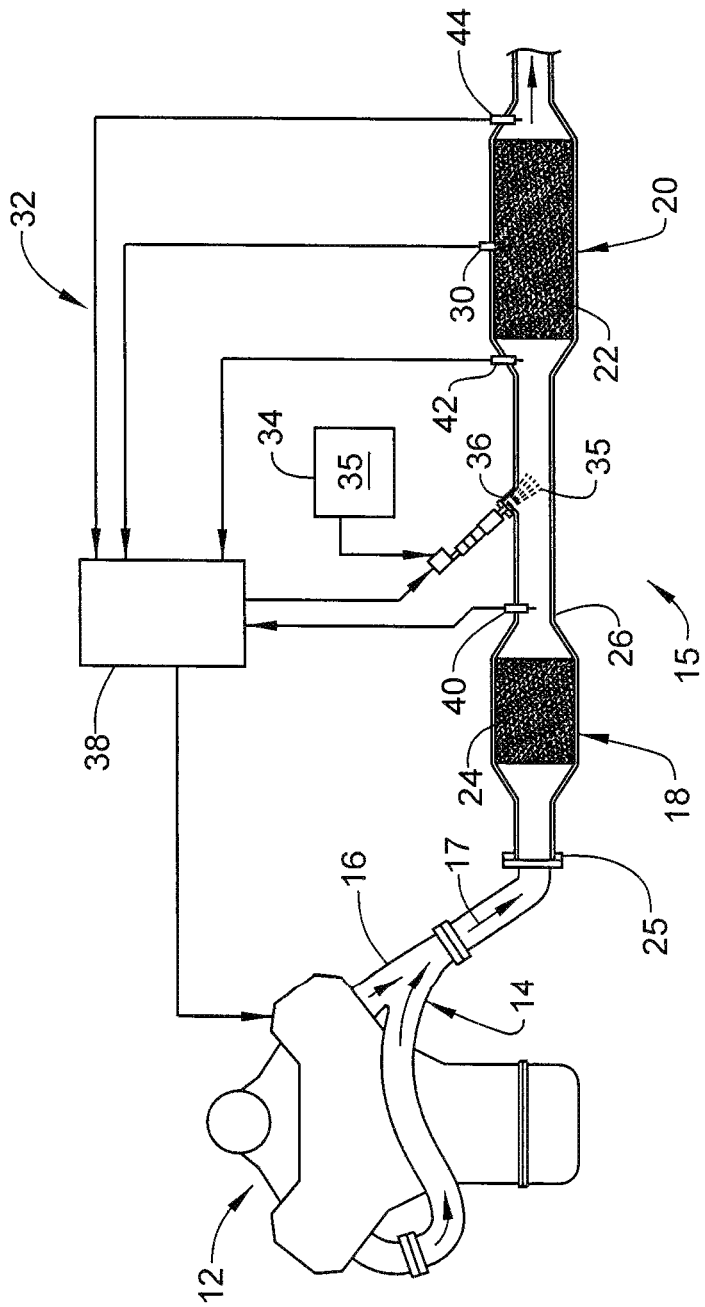
FIG. 2 depicts an exhaust after treatment system of the vehicle of FIG. 1, in accordance with an aspect of an exemplary embodiment.

As shown in FIG. 2 and with continued reference to FIG. 1, exhaust gas treatment system 15 generally includes one or more exhaust gas conduits 16 that channel exhaust gases 17 to one or more exhaust treatment devices. The exhaust gas treatment devices may include, but are not limited to, an oxidation catalyst device ("OC") 18 and a selective catalytic reduction filter ("SCRF") 20. SCRF 20 includes a filter portion 22. Filter portion 22 may take the form of a particulate filter (PF), such as a diesel particulate filter. As can be appreciated, the exhaust gas treatment system 15 may include various combinations of one or more of the exhaust treatment and/or other exhaust treatment devices (not shown). Thus, exemplary embodiments should not be considered to be limited to the present example.

OC 18 can be one of various flow-through, oxidation catalyst devices known in the art. In various embodiments, the OC 18 may include a flow-through metal or ceramic monolith substrate 24. Substrate 24 may be packaged in a stainless steel shell or canister (also not separately labeled) having an inlet 25 and an outlet 26 in fluid communication with the exhaust gas conduit 16. Substrate 24 may include an oxidation catalyst compound disposed thereon. The oxidation catalyst compound may be applied as a washcoat and may contain platinum group metals such as platinum (Pt), palladium (Pd), rhodium (Rh) or other suitable oxidizing catalysts, or a combination thereof. The OC 18 is useful in treating unburned gaseous and non-volatile HC and CO, which are oxidized to form carbon dioxide and water.

SCRF 20 may be disposed downstream of the OC 18. Filter portion 22 may include a catalyst containing washcoat (not separately labeled) disposed thereon. The catalyst containing washcoat may reduce NOx in the exhaust stream by utilizing the reductant to convert the NOx into $N_2$ and $H_2O$ as understood by those ordinarily skilled in the art. The catalyzed containing washcoat may utilize a reductant to reduce the NOx. The reductant may include, but is not limited to, ammonia ($NH_3$), and urea ($CO(NH_2)_2$). The catalyst containing washcoat may contain a zeolite and one or more base metal components such as iron (Fe), cobalt (Co), copper (Cu) or vanadium (V) which can operate efficiently to convert NOx constituents in the exhaust gas 17 into acceptable byproducts (e.g., diatomic nitrogen ($N_2$) and water ($H_2O$)) in the presence of $NH_3$. The efficiency at which the SCRF 20 converts the NOx is hereinafter referred to as "NOx conversion efficiency." The reductant utilized by SCRF 20 may be in the form of a solid, a gas, a liquid, or an aqueous urea solution and may be mixed with air to aid in the dispersion of an injected spray generated by a reductant delivery system, which is discussed in greater detail herein.

Filter portion 22 of the SCRF 20 may also be configured to filter the exhaust gases 17 of carbon and other particulate matter. Filter portion 22 may be constructed using a ceramic wall flow monolith exhaust gas filter substrate that is packaged in a rigid, heat resistant shell or canister, having an inlet and an outlet in fluid communication with exhaust gas conduit 16. It is appreciated that the ceramic wall flow monolith filter substrate is merely exemplary in nature and that filter portion 22 may include other filter devices such as wound or packed fiber filters, open cell foams, sintered metal fibers, etc. The filter substrate may include a ceramic filter element (e.g., a wall-flow element) configured to trap particulate matter included in the exhaust gas 17. The exhaust gas treatment system 15 may perform a regeneration process that regenerates the filter portion 22 by burning off the particulate matter trapped in the filter substrate, as known to those ordinarily skilled in the art.

Exhaust gas treatment system 15 may further include at least one pressure sensor 30 (e.g., a pressure change or delta pressure sensor), as illustrated in FIG. 2. Delta pressure sensor 30 may determine the pressure differential (i.e., $\Delta p$) across the SCRF 20. Although a single delta pressure sensor 30 is illustrated, it is appreciated that a plurality of pressure sensors may be used to determine the pressure differential of the SCRF 20. For example, a first pressure sensor (not shown) may be disposed at the inlet (not separately labeled) of SCRF 20 and a second pressure sensor (also not shown) may be disposed at the outlet (also not separately labeled) of SCRF 20. Accordingly, the difference between the pressure detected by the second delta pressure sensor and the pressure detected by the first delta pressure sensor may indicate the pressure differential of SCRF 20.

Exhaust gas treatment system 15 may further include a reductant delivery system 32 that introduces a reductant to the exhaust gas 17. Reductant delivery system 32 includes a reductant supply source 34 holding an amount of reductant 35, an injector 36, and a reductant injection control module 38. Reductant supply source 34 is in fluid communication with the injector 36. Reductant 35 may include, but is not limited to, ammonia ($NH_3$) and urea. Accordingly, injector 36 may inject a selectable amount of reductant 35 into the exhaust gas conduit 16 such that the reductant is introduced to the exhaust gas 17 at a location upstream of SCRF 20.

In one example, reductant injection control module 38 determines an amount of soot that may have accumulated in SCRF 20 based on inputs from delta pressure sensor 30 and/or a plurality of temperature sensors 40, 42, and 44. A first temperature sensor 40 is disposed at outlet 26 of OC 18, a second temperature sensor 42 is disposed upstream of SCRF 20 (e.g., the SCRF inlet) and a third temperature sensor 44 is disposed downstream of SCRF 20 (e.g., the SCRF outlet).

Figure 3:
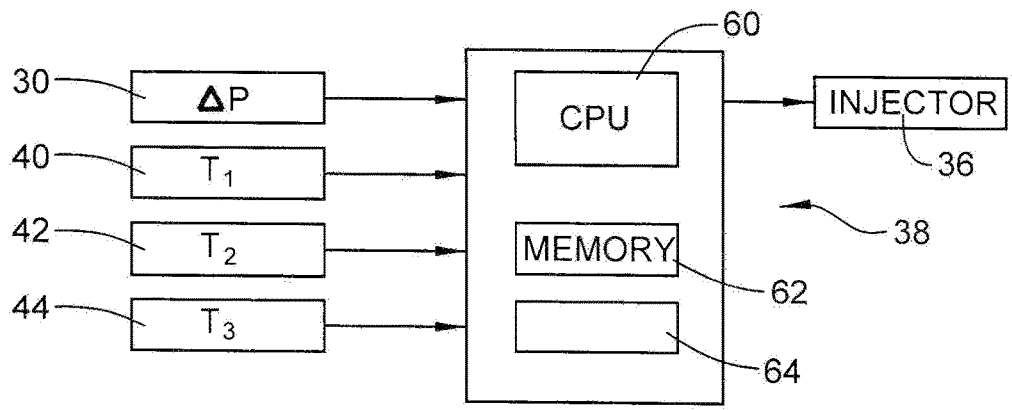
FIG. 3 depicts a block diagram of the system for adjusting reductant delivery into the SCRF, in accordance with an aspect of an exemplary embodiment.

With reference to FIG. 3, and continued reference to FIG. 2, reductant injection control module 38 includes a processor 60 functionally connected to a non-volatile memory 62 containing program instructions, and a shrinking core modeling module 64. Reductant injection control module 38 determines and adjusts an amount of reductant, such as urea, to be injected into exhaust gases 17 based on a shrinking core model developed by shrinking core model module 64. In an embodiment, after reductant injection module 38 calculates an amount of soot in SCRF 20, shrinking core model module 64 mathematically models a flow rate through SCRF 20 based on the amount of soot. Specifically, the amount of accumulated soot is understood to reduce an overall internal volume of SCRF 20. Shrinking core model module calculates a reduction in volume of SCRF 20 based on the amount of accumulated soot. The reduction in volume is employed to model pressure changes resulting in modeled changes of flow to determine an adjustment factor for reductant delivery.

In another aspect of an exemplary embodiment, shrinking core modeling module 64 may adjust a desorption factor of ammonia based on soot accumulation and a supposition that SCRF 20 includes a smaller volume due to accumulated soot. In an example, reductant injection control module 38 determines how much ammonia has been absorbed by SCRF 20, and how much NOx has been converted at a selected temperature in order to determine a desorption amount. Shrinking core modeling module 64 may then determine a weighting factor for the desorption amount based on the amount of soot in SCRF 20. In this manner, reductant injection control module 38 may introduce an amount of reductant that more accurately reflects current operating conditions of SCRF 20.

Figure 4:
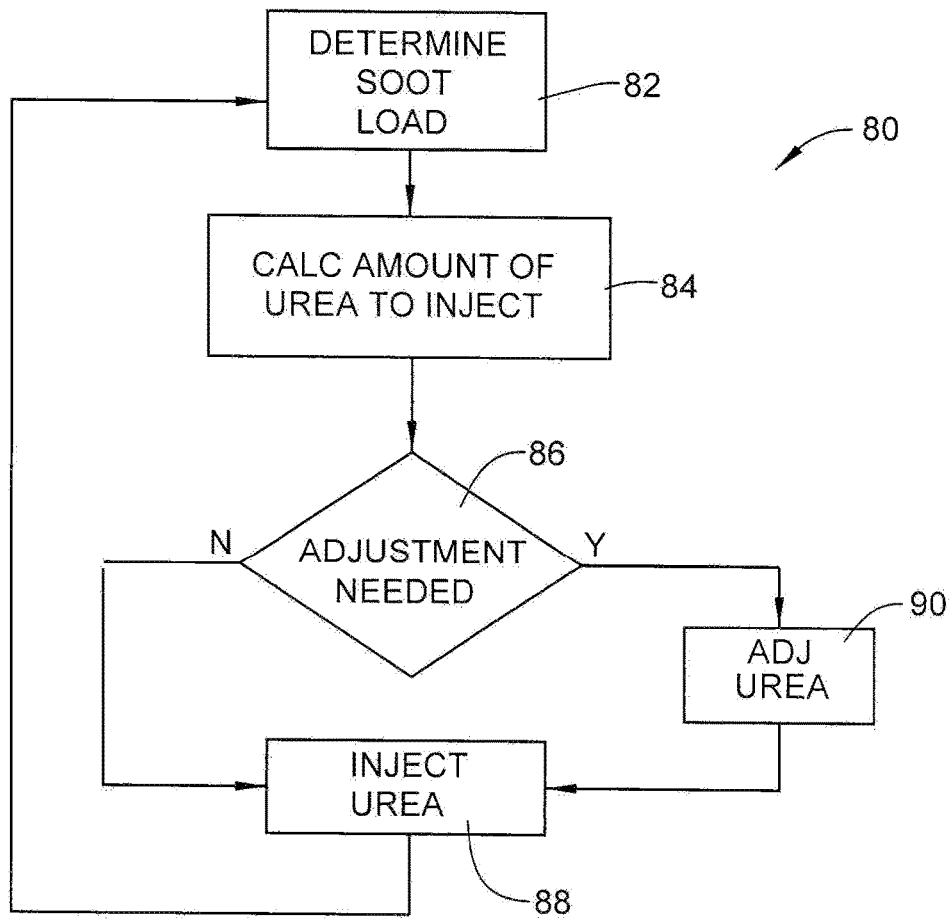
FIG. 4 depicts a flow diagram illustrating a method for adjusting reductant delivery into the SCRF, in accordance with an aspect of an exemplary embodiment.

Reference will follow to FIG. 4, with continued reference to FIGS. 1-3, in describing a method 80 of adjusting reductant injection into SCRF 20 based on accumulated soot. In block 82 reductant injection control module 38, relying on inputs from delta pressure sensor 30 and or first, second and/or third temperature sensors 40, 42, and 44 determines an amount of soot accumulated in SCRF 20. Shrinking core modeling module 64, at block 84 of reductant injection control module 38 determines an amount of reductant 35 to deliver based on accumulated soot, and shrinking core modeling module 64 determines an adjustment factor based on a shrinking core model. At block 86 a determination is made whether an amount of reductant to be injected into SCRF 20 should be adjusted. If no adjustment is necessary, reductant 35 is injected by reductant injector 36 at block 88. If an adjustment would be beneficial, an adjustment is made at block 90 before injecting reductant 35 at block 88. In this manner, reductant injection control module 38 tailors reductant injection to more closely align with operating conditions in SCRF 20 in order to enhance emission abatement.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of adjusting reductant injection for a selective catalyst reduction device with a soot filter (SCRF) comprising:
    calculating, through a processor, an amount of soot in the SCRF;
    determining, through the processor, a shrinking core model of the SCRF including mathematically modeling a flow rate through the SCRF based on the amount of soot;
    modeling pressure changes of exhaust flow through the SCRF based on the modeled flow rate;
    calculating, with the processor using the shrinking core model, an amount of reductant to inject into the SCRF based on the modeled pressure changes; and
    injecting the amount of reductant into the SCRF.

2. The method of claim 1, wherein calculating the amount of soot includes determining a pressure change across the SCRF.

3. The method of claim 1, wherein determining the shrinking core model includes modeling an artificial flow rate of exhaust gases flowing through the SCRF.

4. The method of claim 1, wherein determining the shrinking core model includes determining a desorption amount of ammonia in the SCRF, and applying a shrinking core adjustment factor to the desorption amount.

5. The method of claim 1, wherein calculating the amount of reductant to inject includes calculating a reductant adjustment using the shrinking core model.

6. A reductant injection control module comprising:
    a control module including a processor and a non-volatile memory including a set of instructions which, when executed, causes the processor to:
    calculate an amount of soot in the SCRF;

determine a shrinking core model of the SCRF including mathematically modeling a flow rate through the SCRF based on the amount of soot;
model pressure changes of exhaust flow through the SCRF based on the modeled flow rate;
calculate using the shrinking core model, an amount of reductant to inject into the SCRF based on the modeled pressure changes; and
control injection of the amount of reductant into the SCRF.

7. The reductant injection control module according to claim 6, wherein the set of instructions, when executed, cause the processor to determine a pressure change across the SCRF to calculate the amount of soot.

8. The reductant injection control module according to claim 6, wherein the set of instructions, when executed, cause the processor to model an artificial flow rate of exhaust gases flowing through the SCRF to determine the shrinking core model.

9. The reductant injection control module according to claim 6, wherein the set of instructions, when executed, cause the processor to determine a desorption amount of ammonia in the SCRF, and apply a shrinking core adjustment factor to the desorption amount to determine the shrinking core model.

10. The reductant injection control module according to claim 6, wherein the set of instructions, when executed, cause the processor to calculate a reductant adjustment using the shrinking core model to calculate the amount of reductant to inject.

11. A vehicle comprising:
an internal combustion engine;
an exhaust system including a selective catalyst reduction device with a soot filter (SCRF) fluidically coupled to the internal combustion engine; and
a reductant injection control module comprising:
a control module including a processor and a non-volatile memory including a set of instructions which, when executed, causes the processor to:
calculate an amount of soot in the SCRF;
determine a shrinking core model of the SCRF including mathematically modeling a flow rate through the SCRF based on the amount of soot;
model pressure changes of exhaust flow through the SCRF based on the modeled flow rate;
calculate using the shrinking core model, an amount of reductant to inject into the SCRF based on the modeled pressure changes; and
control injection of the amount of reductant into the SCRF.

12. The vehicle according to claim 11, wherein the set of instructions, when executed, cause the processor to determine a pressure change across the SCRF to calculate the amount of soot.

13. The vehicle according to claim 11, wherein the set of instructions, when executed, causes the processor to model an artificial flow rate of exhaust gases flowing through the SCRF to determine the shrinking core model.

14. The vehicle according to claim 11, wherein the set of instructions, when executed, cause the processor to determine a desorption amount of ammonia in the SCRF, and apply a shrinking core adjustment factor to the desorption amount to determine the shrinking core model.

15. The vehicle according to claim 11, wherein the set of instructions, when executed, cause the processor to calculate a reductant adjustment using the shrinking core model to calculate the amount of reductant to inject.

* * * * *